United States Patent
Mills et al.

[11] Patent Number: 6,018,605
[45] Date of Patent: Jan. 25, 2000

[54] PHOTOINITIATOR—TUNED OPTICAL FIBER AND OPTICAL FIBER RIBBON AND METHOD OF MAKING THE SAME

[75] Inventors: Gregory A. Mills, Claremont; Shail Moorjani, Hickory, both of N.C.

[73] Assignee: Siecor Operations, Hickory, N.C.

[21] Appl. No.: 09/001,680

[22] Filed: Dec. 31, 1997

[51] Int. Cl.[7] .................................................. G02B 6/44
[52] U.S. Cl. ........................... 385/114; 385/128; 385/144
[58] Field of Search ................................... 385/114, 128, 385/129, 144

[56] References Cited

U.S. PATENT DOCUMENTS

| | | | |
|---|---|---|---|
| 3,974,633 | 8/1976 | Clevenger | 57/1 R |
| 4,474,830 | 10/1984 | Taylor | 427/54.1 |
| 4,482,204 | 11/1984 | Blyler, Jr. et al. | 350/96.34 |
| 4,666,244 | 5/1987 | Van der Velde et al. | 350/96.23 |
| 4,783,544 | 11/1988 | Yokoshima et al. | 558/267 |
| 4,900,126 | 2/1990 | Jackson et al. | 350/96.23 |
| 5,015,068 | 5/1991 | Pestisce | 350/96.3 |
| 5,113,471 | 5/1992 | Inaishi et al. | 385/126 |
| 5,181,269 | 1/1993 | Petisce | 385/128 |
| 5,224,192 | 6/1993 | Wagman | 385/112 |
| 5,359,687 | 10/1994 | McFarland et al. | 385/49 |
| 5,408,564 | 4/1995 | Mills | 385/128 |
| 5,416,880 | 5/1995 | Edwards et al. | 385/128 |
| 5,496,870 | 3/1996 | Chawia et al. | 522/90 |
| 5,558,937 | 9/1996 | Woods et al. | 428/378 |
| 5,561,729 | 10/1996 | Parris | 385/113 |
| 5,561,730 | 10/1996 | Lochkovic et al. | 385/114 |
| 5,644,670 | 7/1997 | Fukuda et al. | 385/124 |
| 5,664,041 | 9/1997 | Szum | 385/128 |
| 5,850,498 | 12/1998 | Shacklette et al. | 385/129 |

FOREIGN PATENT DOCUMENTS

| | | | |
|---|---|---|---|
| 09002844A | 1/1997 | Japan | C03C 25/02 |
| 9-142889 | 6/1997 | Japan | G02B 6/44 |
| 97/18493 | 5/1997 | WIPO | G02B 6/44 |

OTHER PUBLICATIONS

Lamp Output Report, Oct., 1997.
Diehl, et al., "UV–Curing with a New Monochromatic UV–Lamp Generation", RadTech Europe 95 Conference Proceedings, Sep. 25–27, 1995.

(List continued on next page.)

Primary Examiner—Rodney Bovernick
Assistant Examiner—Robert E. Wise
Attorney, Agent, or Firm—Timothy J. Aberle

[57] ABSTRACT

An optical fiber (20) includes a silica-based core (22) which is operative to transmit light and is surrounded by a silica-based cladding (24) having a lower index of refraction than the core (22). A primary coating (26) surrounds cladding (24), and a secondary coating (28) surrounds primary coating (26). Optical fiber ribbon (40) includes a ribbon matrix material (42) which surrounds a plurality of optical fibers (20). Primary coating (26) comprises a photoinitiator which has a peak absorbance in a relatively short wavelength UV spectrum. Secondary coating (28) comprises a photoinitiator which has a peak absorbance in a relatively long wavelength UV spectrum. A method of making optical fiber (20) by irradiating primary coating (26) with a first radiation source (74), the first radiation source has an emission spectrum with a potent wavelength band, the peak absorbance of the photoinitiator in primary coating (26) has a wavelength band which is complementary to that of the potent wavelength band of the radiation source (74) whereby primary coating (26) is rapidly cured. The method further includes applying secondary coating (28) on the cured primary coating. Secondary coating (28) has a photoinitiator with a peak absorbance in a relatively long wavelength UV spectrum of about 300–320 nm. Secondary coating (28) is then irradiated with a second radiation source (78), for example, an excimer type UV radiation source with an emission spectrum having a potent wavelength band between about 300–350 nm, and a dosage ability of over 207.2 Watts. The peak absorbance of the photoinitiator in secondary coating (28) is complementary to that of the potent wavelength band of second radiation source (78) whereby secondary coating (28) is rapidly cured.

25 Claims, 5 Drawing Sheets

OTHER PUBLICATIONS

Schaeffer, et al., "The Criticality of Peak Irradiance (Light Intensity) as it Relates to Efficient UV Curing", RadTech, 1994, pp. 314–319. No Month.

Schaeffer, William R., "Enhanced UV Curing of Heavily Pigmented Coatings for the Wood Industry Through Increased Peak Irradiance and Careful Wavelength Selection", RadTech, 1992, pp. 201–211. No Month.

Schaeffer, William R.; "UV Curable Materials Response and its Relationship to Power Level and Lamp Spectra", RadTech, 1990, pp. 29–37. No Month.

Schaeffer, William R., "The Practical Effects of Wavelength Selection", RadTech 1988, pp. 127–132 No Month.

Derwent Abstract; Kokai 9–142889; Nov. 20, 1995.

Practical Relationships Between UV Lamps and the UV Curing Process "Window"; R.W. Stowe; Fusion UV Curing Systems, Rockville, Maryland, pp. 307–313; RadTech; May, 1994.

Photoinitiators of UV Curing; A Formulator's Guide; Ciba–Geigy Corp; 1995. No Month.

Photoinitiator for Ultraviolet Curing of Coatings and Inks; Irgacure 907; Ciba–Geigy Corp; 1987. No Month.

Photoinitiator for Ultraviolet Curing of Inks, Pigmented Coatings and Thick Section Curing; Irgacure 369; Ciba–Geigy Corp; 1993. No Month.

Liquid Photoinitiator for Ultraviolet Curing of Coatings; Darocur 1173; Ciba–Geigy Corp; 1994. No Month.

Photoinitiator for Ultraviolet Curing of Coatings and Inks; Irgacure 651; Ciba–Geigy Corp.; 1994. No Month.

The Source of Innovation!; Heraeus Excimer UV Lamps; HNG–B 190E; Sep., 1995.

VIP Cobalt Bulb; Fusion UV Systems, Inc.; (4 pages); May, 1997.

Lucirin TPO; Technical Information; Jul., 1997; BASF.

"Investigations of UV–Curing, Pigmented Coatings, " Norbert Pietschmann; Journal of Radiation Curing®, vol. 21, No. 4 1994; pp. 2–9. No Month.

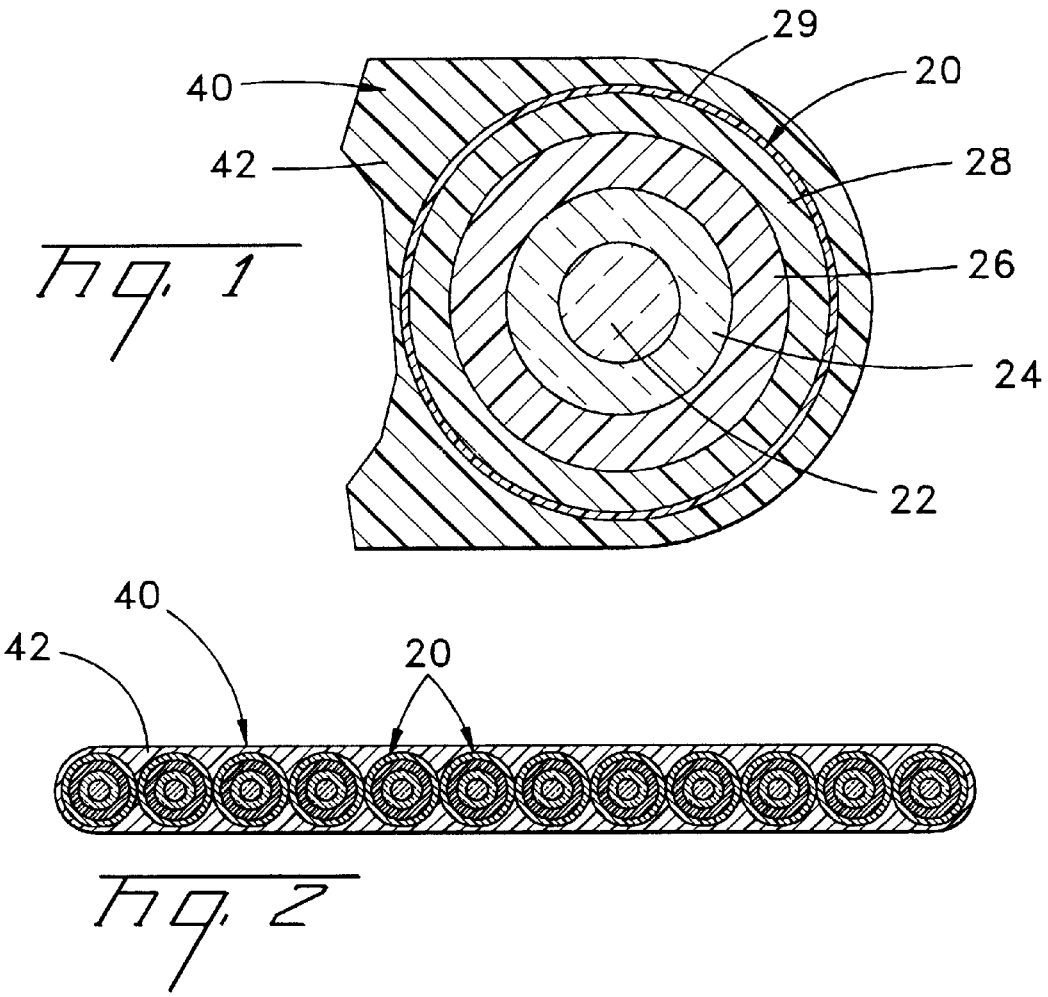
Fig. 1
Fig. 2
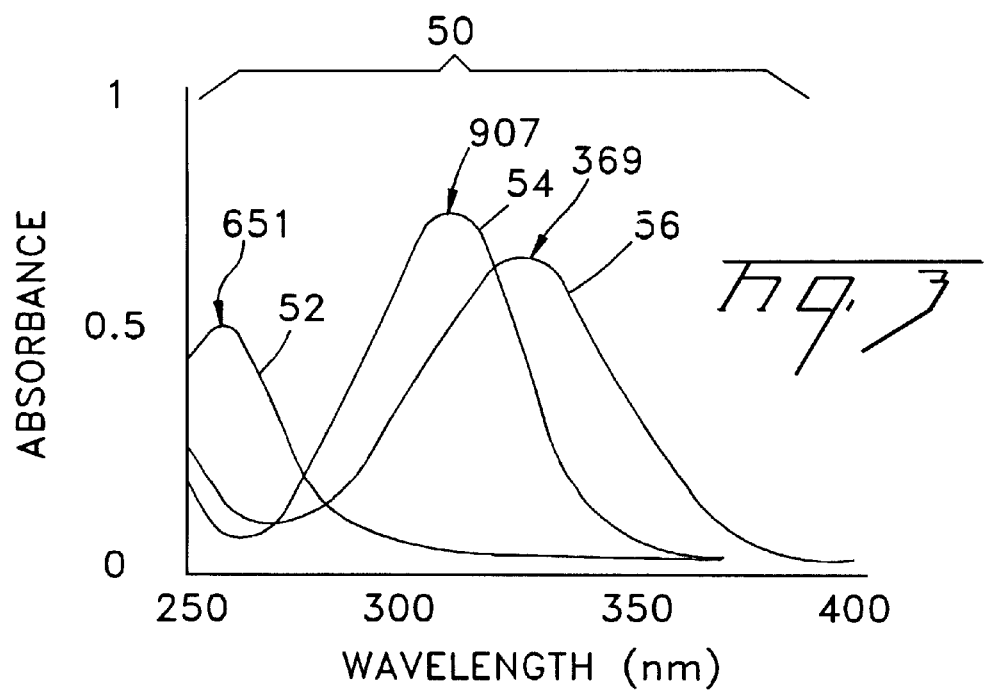
Fig. 3

PHOTOINITIATOR— TUNED OPTICAL FIBER AND OPTICAL FIBER RIBBON AND METHOD OF MAKING THE SAME

The present invention relates to an optical fiber, and more particularly, to an optical fiber with organic primary and secondary coatings, and an optical fiber ribbon having an organic ribbon matrix coating surrounding at least two of the optical fibers.

Optical fibers are used to transmit telecommunication, computer, and data information. A typical optical fiber manufacturing process, such as is disclosed in U.S. Pat. No. 5,181,269, involves vertically suspending a glass preform rod which is moved into a furnace at a controlled rate. The glass preform rod softens in the furnace and a glass fiber is drawn from the preform rod by a capstan located at the base of a draw tower. For chemical preservation and mechanical protection of the glass fiber, it is common in the optical fiber manufacturing industry to apply primary and secondary coatings to the glass fiber. The primary coating is applied on the glass fiber so as to completely coat the fiber, and the secondary coating is applied over the primary coating. The glass fiber with coatings may be termed an optical fiber. Optical fibers may be incorporated in tight buffer, loose tube, or optical fiber ribbon applications. Optical fiber ribbons include at least two optical fibers bound together by a ribbon matrix coating.

Organic coatings of the ultra-violet light curable (UV curable) type, and visible light curable type, have been developed for use as primary, secondary, and ribbon matrix coatings. As described in more detail below, UV curable coatings are cured by UV irradiation. UV curable coatings are generally tough, exhibit high resistance to abrasion, perform well when under stress, and are adaptable to mass production processes. When cured, a UV curable primary coating should have a Modulus of about $10^6$ Pa, and a UV curable secondary coating should have a relatively higher Modulus of about $10^9$ Pa. The secondary coating is essentially a semi-rigid, protective shell around the glass fiber, and the inner primary coating is preferably a soft cushion for the glass fiber. Taken together, where the Moduli of the coatings are within acceptable ranges, the coatings serve to isolate the optical fiber from stresses which might otherwise cause microbending in the glass fiber. Microbending, i.e. the formation of microscopic bends in the glass fiber, is undesirable because it may negatively effect the performance of an optical fiber by causing attenuation, i.e. a decrease in the magnitude of transmitted light power (usually measured in decibels at a specific wavelength). Fibers become more susceptible to microbending when the Modulus of the primary coating is increased so that it substantially loses its softness. Substantial increases to the Modulus of the primary coating, after it has been initially cured, may result from exposure of the primary coating during post-cure handling of the optical fiber, or processing of the optical fiber, for example, in ribbon matrix coating and/or optical fiber coloring processes. An increase to the Modulus of either of the coatings is termed post-cure hardening.

A review of a typical UV curing process provides a backdrop for the present invention and illustrates the post-cure hardening problem. The curing of a radiation-curable composition is essentially a polymerization of the coating, whereby the coating undergoes a transition from a liquid to a solid. Prior to application to the glass fiber, the primary and secondary coatings comprise formulations of liquid monomers, oligomer "backbones" (with e.g. acrylate functional groups), and photoinitiator additives. Photoinitiator additives function by: absorbing energy radiated by the UV or visible light source; fragmenting into reactive species; and then initiating a polymerization/hardening reaction of the monomers and oligomers. The result is a solid network of crosslinking between the monomers, oligomers, and other additives. The photoinitiator therefore begins a chemical reaction, which promotes the solidification of the liquid coating to form a generally solid film.

A key to the process is the reaction of a photoinitiator in response to UV radiation. A photoinitiator has an inherent absorption spectrum, which is conveniently measured in terms of absorbance as a function of the wavelength of the radiated light. Each photoinitiator has a characteristic photoactive region, i.e. a photoactive wavelength range (typically measured in nanometers (nm)). Commercially available photoinitiators may have a photoactive region in the vacuum ultra-violet (VUV) (160–200 nm), ultra-violet (UV) (200–400 nm), or visible light (V-light) (400–700 nm) wavelength range. When the material is irradiated by, e.g. a VUV, UV or V-light lamp, which emits light in the photoactive region, the material will cure.

In the application of a radiation curable material to a substrate, light intensity and cure time are factors. The light dose, i.e. the radiant energy arriving at a surface per unit area, is inversely proportional to line speed, i.e. the speed the radiation curable material moves under a radiation source. The light dose is the integral of radiated power as a function of time. In other words, all else being equal, the faster the line speed the higher the radiation intensity must be to achieve adequate curing. After a radiation curable material has been fully irradiated, the material is said to be cured. Curing occurs in the radiation curable material from the side facing the radiation source down or away from the source. Because portions of the material closer to the light source block light from reaching non-cured portions of the material, a cure gradient may be established. Depending on the amount of incident light, a cured material may therefore exhibit different degrees of cure.

The degree of cure affects the mechanical characteristics, e.g. Modulus, of the material. For example, for a low Modulus material, an over-cured portion of material may be defined as one with a higher than desired Modulus, i.e. too rigid, and an under-cured portion of material may be defined as one having a Modulus which is too low, i.e. too soft. On the other hand, high Modulus materials may become brittle when over-cured. However, with reference to the above mentioned post-cure hardening problem, the polymerization/hardening reaction initiated by the photinitiator may continue where the material is subjected to a radiation source, i.e. in post-cure ribbonizing or optical fiber coloring processes. Because of the potential for molecular mobility, the post-cure hardening problem is particularly acute in UV curable materials having a low Modulus. The post-cure continuation of the polymerization/hardening reaction may negatively effect mechanical characteristics of the solid film, in particular, the Modulus of the material may be increased beyond that which is desirable.

To illustrate the foregoing with reference to optical fibers which utilize UV curable coatings, the following provides a background to the present invention. Manufacture of an optical fiber having UV curable coatings may be accomplished by simultaneous or tandem applications of coatings to the fiber. In a simultaneous application of the coatings, such as disclosed in U.S. Pat. No. 4,474,830, a dual coating applicator is used to channel the liquid coatings to the glass fiber. Upon exiting the applicator, the coatings are simultaneously cured by exposure to UV light radiating from a single source. The photoinitiators in the coatings disadvantageously have comparable photoactive regions, whereby the secondary coating material may cure first, and light within the photoactive region of the primary coating photoinitiator will be absorbed at the secondary coating level, leaving little light for curing of the primary coating. In other words, unless the line speed is slowed, the primary coating may be under-cured. Slower line speeds, however, are undesirable because they may result in decreased glass fiber draw rates and overall lower optical fiber production rates.

A suggested solution to the foregoing problem is disclosed in U.S. Pat. No. 5,015,068, which is hereby incorporated by reference in its entirety, wherein primary and secondary coatings including non-comparable photoinitiators are cured by a single V-spectrum radiation source. Each photoinitiator has a different photoactive region. The primary coating includes camphorquinone, a photinitiator which is photoactive in the visible light spectrum. The secondary coating includes a photoinitiator which is photoactive in the short wavelength UV spectrum (200–300 nm), namely: Irgacure 651 (benzildimethyl ketal, absorption peak about 250 nm); or Darocure 1173 (alpha-Amino-ketones recommended by the manufacturer for water-borne systems, absorption peak in the short wavelength UV spectrum— about 300 nm). The V-spectrum radiation source, which radiates light predominantly in the 400–450 nm (visible light) range, with a marginal amount of UV spectrum light, is used to simultaneously irradiate both coatings. The light dose is therefore heavily weighted toward the V-spectrum as compared to the UV spectrum. The secondary coating is virtually transparent to the V-light, so that the V-light passes through the secondary coating and impinges on and is absorbed by the primary coating. The V-light is virtually unattenuated by the secondary coating, and the secondary coating is cured by the marginal amount of UV-light.

The use of a photoinitiator with a V-light photoactive region for the primary coating is, however, disadvantageous. As the optical fiber may be subjected to post-cure V-light, e.g. ordinary daylight, during post-cure handling or processing of the optical fibers, the primary coating is subject to post-cure hardening. As noted above, post-cure hardening may undesirably increase the Modulus of the primary coating which may increase microbending attenuation losses in the fiber. Additionally, reliance on a single V-light source is undesirable, as the radiated energy dosage does not include a balanced proportion of energy in the respective photoactive regions of the photoinitiators. So, line speeds must be maintained at a less than optimal rate to avoid under-curing of the secondary coating.

U.S. Pat. No. 5,416,880 discloses coating combinations including urethane acrylate oligomers combined with photoinitiators, wherein coatings are applied wet-on-wet and are simultaneously cured with a radiation source. IRGACURE 651 was used as a photoinitiator for some primary coatings, and LUCIRIN TPO was used as a photoinitiator for primary and secondary coatings. As noted above, IRGACURE 651 is a photoinitiator having a photoactive absorption peak generally in the 250 nm range. There is a relatively large disparity: LUCIRIN TPO, with an absorption peak at generally over 380 nm, is reactive to V-spectrum light. In view of the foregoing, the primary or secondary coating with a photoinitiator having a V-spectrum photoactive region is disadvantageous. As the optical fiber may be subjected to short wavelength UV-spectrum or V-spectrum light, e.g. during coloring or ribbonizing of the optical fibers, the coating with a V-light photoactive photoinitiator is subject to post-cure hardening and the potential for an undesirable increase in Modulus. Moreover, since there is an absorption peak disparity of over 100 nm, the simultaneous curing of the coatings by a single radiation source requires a slower line speed.

OBJECT(S) OF THE INVENTION

It is an object of the present invention to provide an optical fiber having primary and secondary coatings comprising photoinitiators which minimize attenuation due to post-cure hardening.

It is an object of the present invention to provide an optical fiber ribbon having optical fibers with primary and secondary coatings, and a ribbon matrix coating, the primary and secondary coatings comprising pre-selected photoinitiators which minimize attenuation due to post-cure hardening.

It is an object of the present invention to provide a method for making an optical fiber having primary and secondary coatings which comprise pre-selected photoinitiators which minimize attenuation due to post-cure hardening.

It is an object of the present invention to provide a method for making an optical fiber ribbon comprising optical fibers having primary and secondary coatings which comprise pre-selected photoinitiators which minimize attenuation due to post-cure hardening.

It is an object of the present invention to provide an optical fiber ribbon having optical fibers with primary and secondary coatings, and a fiber color layer, the optical fibers surrounded by a ribbon matrix coating, the primary and secondary coatings comprising pre-selected photoinitiators which minimize attenuation due to post-cure hardening.

It is an object of the present invention to provide loose tube and tight buffer fiber optic cables respectively comprising at least one optical fiber according to the present invention.

It is an object of the present invention to provide a fiber optic cable comprising at least one optical fiber ribbon according to the present invention.

BRIEF DESCRIPTION OF THE DRAWING FIGURES

FIG. 1 is a partial cross section of an optical fiber ribbon, according to the present invention.

FIG. 2 is a cross section of an optical fiber ribbon according to the present invention.

FIG. 3 is a graph showing exemplary absorption spectra curves for pre-selected photoinitiators according to the present invention; the graph plots absorbance as a function of wavelength.

DETAILED DESCRIPTION OF THE INVENTION

Figure 4:
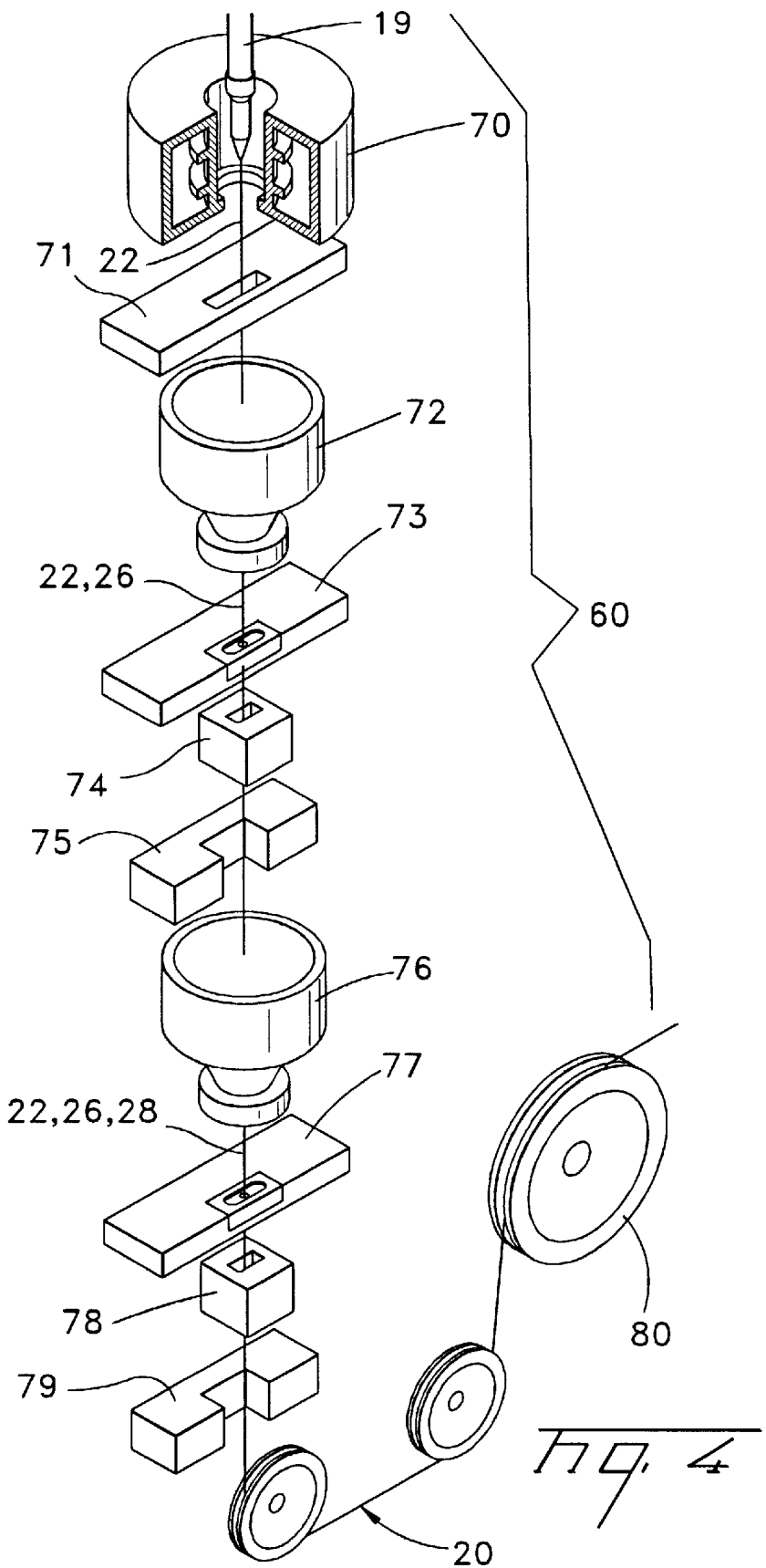
FIG. 4 is a schematic view of a process for making an optical fiber according to the present invention.

Referring to FIGS. 1–3, an optical fiber 20, and an optical fiber ribbon 40 comprising optical fibers 20, according to the present invention will be described. Optical fiber 20 includes a silica-based core 22 which is operative to transmit light and which is surrounded by a silica-based cladding 24 having a lower index of refraction than core 22. For example, an SMF-28 fiber made commercially available by Corning Incorporated, is suitable for use with the present invention. A primary coating 26 surrounds cladding 24, and a secondary coating 28 surrounds primary coating 26. Optical fiber ribbon 40 includes a ribbon matrix 42.

In a preferred embodiment of the present invention, primary coating 26 may be a formulation including an acrylate resin. FIG. 3 illustrates absorbance spectra 50 of exemplary photoinitiators according to the present invention. The formulation of primary coating 26 includes a photinitiator having a photoactive peak absorbance 52 (FIG. 3) in the relatively short wavelength UV spectrum (200–300 nm), i.e., the photoactive peak absorbance is in a wavelength band of about 240–270 nm. The photoinitiator in primary coating 26 may comprise a benzildimethyl ketal material, for example, IRGACURE 651 made commercially available by Ciba. IRGACURE 651 is an efficient photoinitiator for the photocuring of unsaturated resin, e.g. unsaturated acrylates (urethane and epoxy), and monomer systems.

Secondary coating 28 is preferably a formulation including an acrylate resin cured with a photoinitiator comprising a photoactive peak absorbance in the relatively long wavelength UV spectrum, i.e., a wavelength band of about 300 to 380 nm, but preferably in the 300 to 350 nm range. According to the present invention, secondary coating 28 includes a photoinitiator comprising an alpha-Amino ketone material, for example: IRGACURE 369, which has an absorption peak 56 comprising a peak absorbance wavelength band of about 320–350 nm (FIG. 3); or IRGACURE 907, which has an absorption peak 54 comprising a peak absorbance wavelength band of about 300–320 nm (FIG. 3). IRGACURE 369 and IRGACURE 907 are made commercially available by Ciba, and are efficient UV curing agents.

To enhance the absorbance of secondary coating 28, the formulation thereof may include a conventional UV absorber additive. UV absorbers act by absorbing incident light and converting it to heat energy. The use of a UV absorber in secondary coating 28 may, however, reduce its cure speed—to counter this, an increased concentration of photoinitiator in the formulation may be appropriate. Suitable UV absorbers are disclosed in U.S. Pat. No. 4,482,204, which is hereby incorporated by reference in its entirety. Another suitable UV absorber is sold under the trade name TINUVIN, made commercially available by Ciba. Ribbon matrix 42 is preferably a formulation which includes an acrylate resin and a photoinitiator, which formulation is cured by exposure to long wavelength UV spectrum radiation (300–400 nm).

Referring to FIG. 4, an apparatus 60 for making an optical fiber according to the present invention is described. The process begins with a glass preform 19 which is heated in a furnace 70 to a temperature of about 2000° C. As the preform 19 is fed into and through furnace 70, a glass fiber 22 having a cladding 24 is drawn from the molten material.

The diameter of glass fiber 22 is measured by a measuring device 71, the output of which is an input to a feedback control system (not shown) for controlling the rate at which glass fiber 22 is drawn from preform 19. Within the control system, the measured diameter is compared to a desired value and an output signal is generated which adjusts the draw speed of glass fiber 22 such that the diameter of fiber 22 approaches the desired value.

After fiber 22 cools, it is passed through a coating die 72 wherein it is coated with liquid primary coating 26, thereby forming a first intermediate fiber 22,26. For increased coating speeds with reduced bubble formation in liquid coating 26, coating die 72 may be of the pressurized coating die type. Such a die is disclosed in U.S. Pat. No. 4,374,161, which is incorporated by reference herein in its entirety. For high speed processing, a gas purge may be placed above the coating die. After first intermediate fiber 22,26 is passed through a concentricity gauge 73, a radiation source 74 irradiates coating 26 and thereby cures it. Intermediate fiber 22,26 has a preferred cured diameter of about 160–220 micrometers, and a Modulus of less than about 2.0 MPa, and is preferably less than about 1.4 MPa at room temperature.

Figure 5:
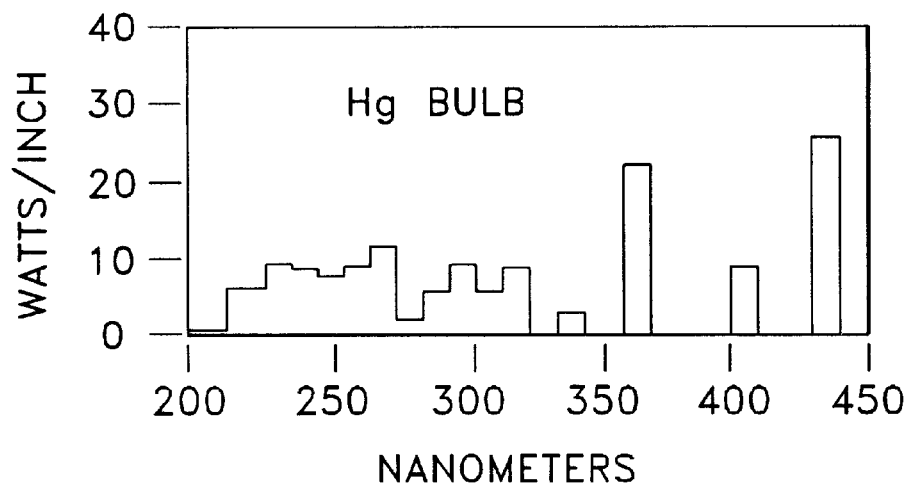
FIG. 5 is a graph of an emission spectrum of a radiation source which may be used in the process of FIG. 4.
Figure 6:
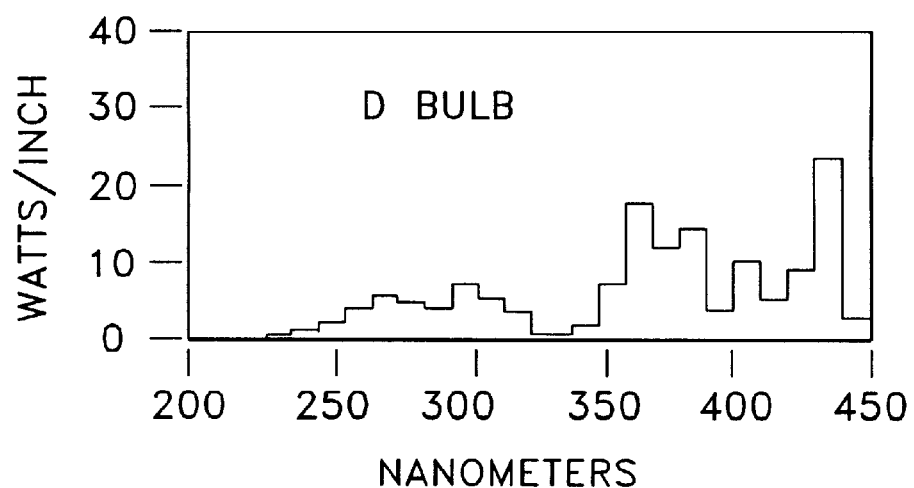
FIG. 6 is a graph of an emission spectrum of a radiation source which may be used in the process of FIG. 4.

In a preferred embodiment of the present invention, radiation source 74 may comprise an H-bulb (mercury vapor). The H-bulb may be one having a standard mercury spectral line, and is made commercially available by Fusion UV Curing Systems. As shown in FIG. 5, the emission spectrum of radiation source 74 is such that energy is radiated predominantly in the short wavelength UV spectrum (FIG. 5). In other words, radiation source 74 is capable of radiating a potent dosage in a wavelength band of about 200–300 nm. This is important because the peak absorbance of the photoinitiator in primary coating 26 is complementary with, i.e., is pre-selected to be within, this band. In other words, the photoinitiator in primary coating 26, having a peak absorbance in the short wavelength UV spectrum, is irradiated by a potent wavelength band of the emission spectrum of radiation source 74, which wavelength band is complementary to that of the peak absorbance wavelength band of the photoinitiator. Consequently, primary coating 26 is rapidly cured, i.e., changed from a liquid to a solid at a rapid rate, which rapid curing, according to an advantage of the present invention, permits fast line/processing speeds. Next, device 75 measures the outer diameter of cured intermediate fiber 22,26 for a feedback loop which controls the diameter by varying process parameters, e.g. the temperature and/or pressure of the coating die.

First intermediate fiber 22,26 is then passed through a second coating die 76 wherein liquid secondary coating 28 is applied to first intermediate fiber 22,26 to form a second intermediate fiber 22,26,28. A concentricity gauge 77 measures the concentricity of second intermediate fiber 22,26,28 and then a radiation source 78 irradiates second intermediate fiber 22,26,28 and thereby cures it with a preferred diameter of about 245 micrometers, and a preferred Modulus greater than 500 MPa at room temperature.

Figure 7:
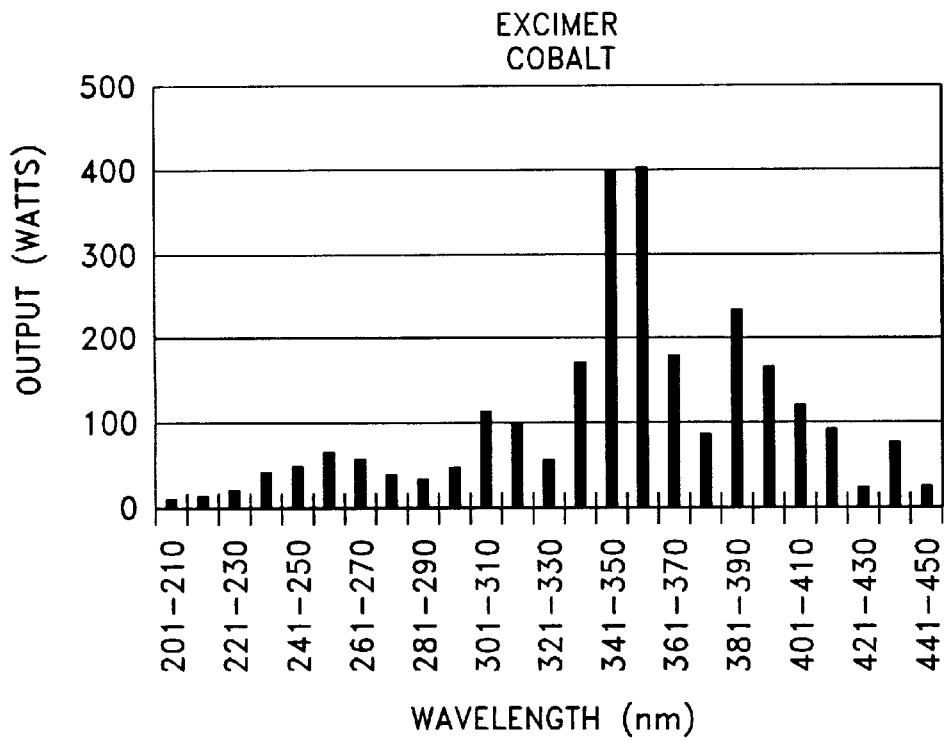
FIG. 7 is a graph of an emission spectrum of a radiation source which may be used in the process of FIG. 4.
Figure 8:
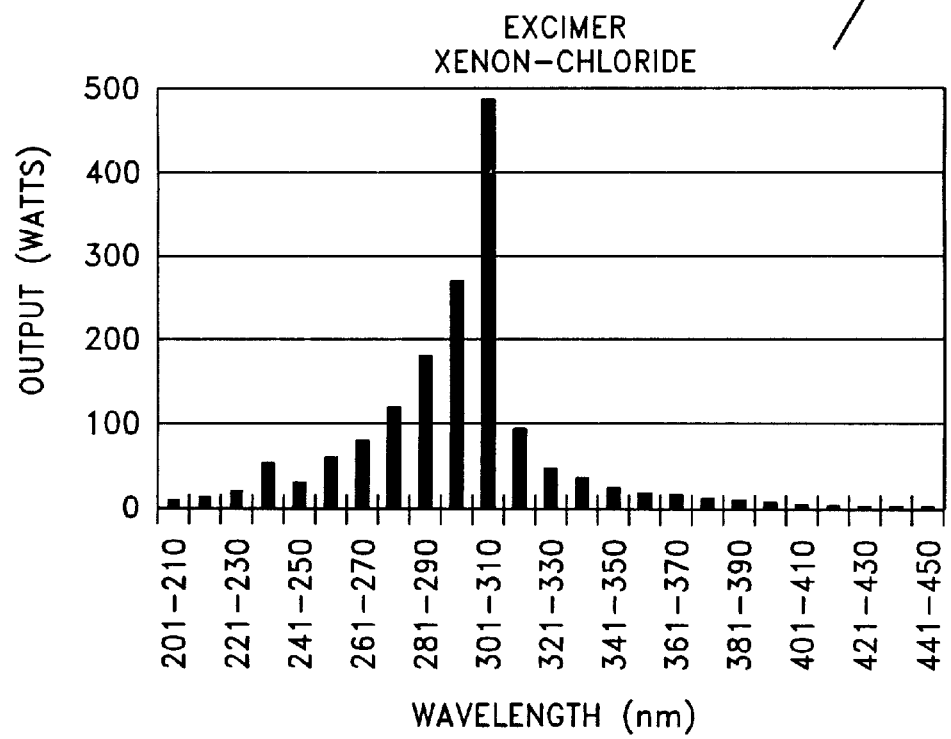
FIG. 8 is a graph of an emission spectrum of a radiation source which may be used in the process of FIG. 4.

In a preferred embodiment of the present invention, the emission spectrum of radiation source 78 is complementary to the peak absorbance of the photoinitiator in secondary coating 28. A suitable mercury vapor type radiation source comprises, for example, a D-bulb (mercury vapor plus metal halide(s)). However, a more preferred radiation source comprises an excimer UV bulb, wherein an excimer light source is used to generate a comparatively high amount of UV light. Examples of suitable excimer UV radiation sources are, for example, Cobalt and Xenon-chloride bulbs, the emission spectra of which are shown in FIGS. 7 and 8, respectively.

According to the present invention, the best curing results are obtained by a radiation source having a comparatively high dosage ability in the 300–350 nm wavelength band. The approximate dosage ability of the foregoing preferred radiation sources, on a 600 Watts/inch platform, and between 300–350 nm, is the following: D bulb—281.2 Watts; Xenon-chloride bulb—684.7 Watts; and Cobalt bulb—808.6 Watts. By comparison, the dosage ability of a radiation source comprising an H bulb (600 Watts/inch platform between 300–350 nm) is about 207.2 Watts.

In view of the foregoing, the emission spectrum of radiation source 78 may be advantageously distinct from that of radiation source 74, in that the emission spectrum of radiation source 78 is more potent in a 300–350 nm wavelength band. The photoactive peak absorbance of the photoinitiator in secondary coating 28 is complementary to, i.e., is pre-selected to be within, the potent wavelength band of radiation source 78. For example, as IRGACURE 907 has a peak absorbance at about 300–320 nm, and as the Xenon-chloride excimer radiation source is highly potent in this band, the Xenon-chloride radiation source is preferred for use with IRGACURE 907. In the same vein, as IRGACURE 369 has a peak absorbance at about 320–350 nm, and the Cobalt excimer radiation source is highly potent in this band, the Cobalt excimer radiation source is preferred for use with IRGACURE 369. Thus the photoinitiator is pre-selected whereby the peak absorbance thereof is within a potent wavelength band of radiation source 78.

Moreover, in avoiding post-cure hardening of primary coating 26, this is important because the peak absorbance of primary coating 26 is substantially not in the range of highest potency of radiation source 78. In other words, although the long wavelength UV photoinitiator in secondary coating 28 is highly photoactivated by a potent band of the emission spectrum of radiation source 78, there is zero or minimum photoactivity of the short wavelength UV photoinitiator of primary coating 26. Consequently, secondary coating 28 rapidly cures from a liquid to a solid which, according to an advantage of the present invention, permits an increase in the line/processing speeds of optical fiber 20. But by the same token, because the photoinitiator in primary coating 26 is substantially not as sensitive to long wavelength UV energy, post-cure hardening of primary coating 26 is minimized or altogether avoided. At the end of the optical fiber manufacturing process, device 79 measures the outer diameter of cured optical fiber 20, and optical fiber 20 is moved through a capstan 80 and is sent to a spooling station (not shown).

According to the present invention, optical fibers 20 may be colored and made part of an optical fiber ribbon 40 with a minimum of post-cure hardening of primary coating 26. Optical fibers 20 are colored by coating them with a pigment dispersed in a UV curable carrier/binder system which forms a color layer 29 (FIG. 1). Color layer 29 is cured by a long wavelength UV source with a marginal amount of short wavelength UV radiance. As shown in FIG. 3 IRGACURE 907 and IRGACURE 369 have some absorbance ability in the short wavelength UV spectrum (250–300 nm and below). A preferred UV absorber would absorb UV light in the short UV wavelength spectrum. Secondary coating 28 absorbs short wavelength UV energy during the coloring of optical fibers 20 before it impinges on primary coating 26. Post-cure hardening of primary coating 26 is thereby minimized.

Optical fiber ribbon 40 is made by arranging optical fibers 20 and extruding a UV curable, ribbon matrix 42 therearound and curing it with a UV radiation source. The radiation source may be an H or a D bulb: an H bulb is preferred for establishing a cure gradient and better peelability, and a D bulb is preferred where it is desired to have little cure gradient. In a preferred embodiment, the formulation of ribbon matrix 42 comprises a UV curable acrylate material with a photoinitiator. The photoinitiator is preferably photoactive in the long UV wavelength spectrum, i.e. about 300–400 nm. During the curing of ribbon matrix 42, secondary coating 28 absorbs some of the short wavelength UV spectrum light, thereby minimizing post-cure hardening of primary coating 26. To protect primary coating 26 from post-cure hardening, ribbon matrix 42 may include UV absorbers which are capable of absorbing short wavelength UV light. Additionally, for enhancing strippabilty/peelability of ribbon matrix 42, optical fiber ribbon 40 may include, for example, respective release layers between optical fibers 20 and ribbon matrix 42, such as is disclosed in U.S. Pat. No. 4,900,126, which is hereby incorporated by reference in its entirety. Further, ribbon matrix 42 may include an additive for reducing the coefficient of friction of the ribbon matrix, such as is disclosed in commonly assigned patent U.S. Pat. No. 5,561,730, which is hereby incorporated by reference in its entirety.

Figure 9:
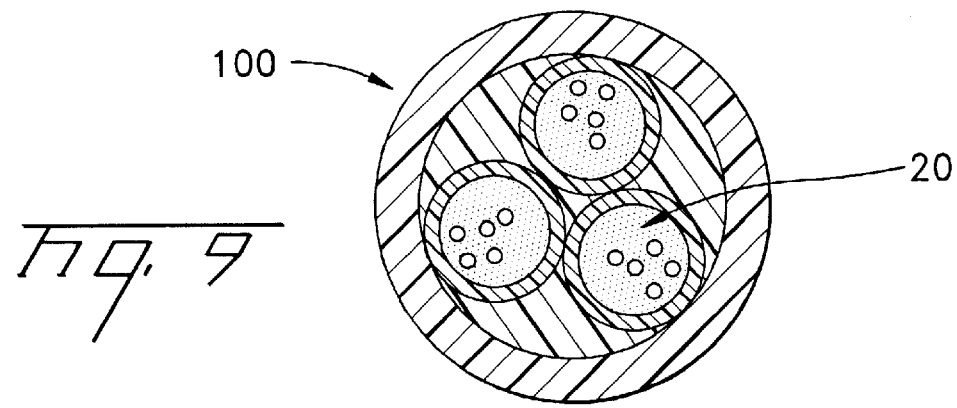
FIG. 9 is a cross section of a loose tube fiber optic cable comprising an optical fiber according to the present invention.
Figure 10:
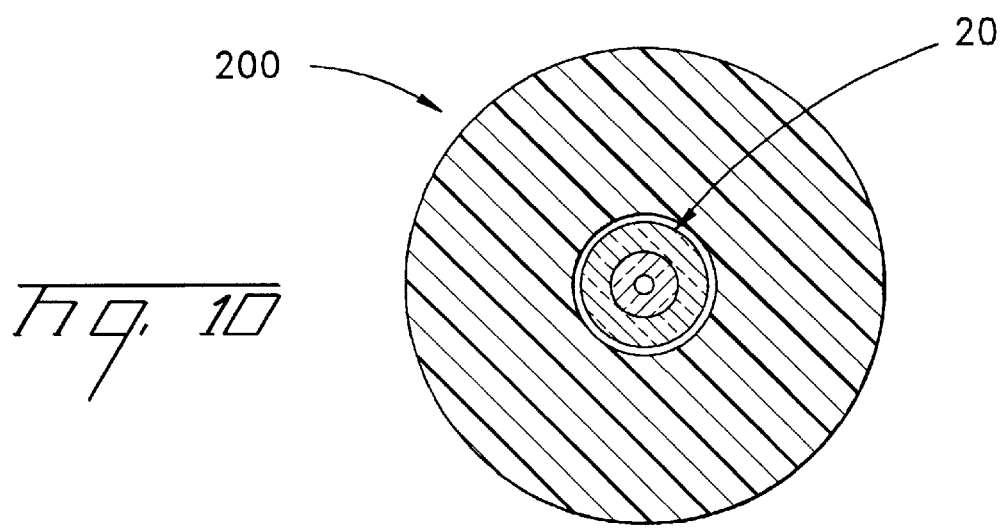
FIG. 10 is a cross section of a tight buffer fiber optic cable comprising an optical fiber according to the present invention.
Figure 11:
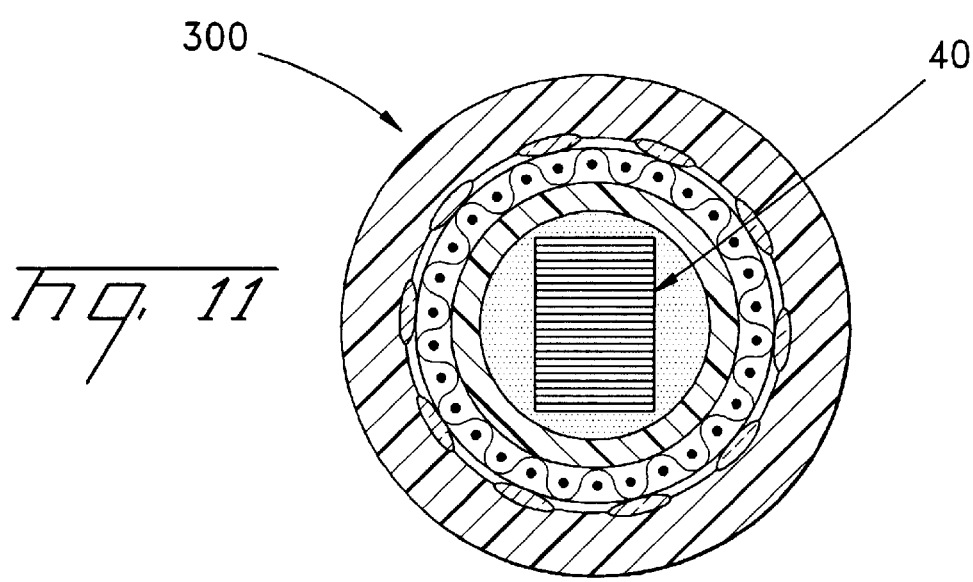
FIG. 11 is a cross section of a monotube type fiber optic cable comprising a stack of optical fiber ribbons according to the present invention.

The present invention has thus been described with reference to the foregoing embodiments, which embodiments are intended to be illustrative of the inventive concepts rather than limiting. Skilled artisans will appreciate that variations and modifications of the foregoing embodiments may be made without departing from the scope of the appended claims. For example, optical fibers 20 may be used in a loose tube (FIG. 9) or tight buffer (FIG. 10) fiber optic cable configuration, such as are respectively disclosed in commonly assigned patents U.S. Pat. No. 5,224,192 and U.S. Pat. No. 5,408,564, which patents are incorporated by reference in their respective entireties. Moreover, a plurality of ribbons 40 may be formed into a ribbon stack and incorporated in a fiber optic cable (FIG. 11), such as is disclosed in commonly assigned patent U.S. Pat. No. 5,561,729, which is incorporated by reference in its entirety. Additionally, although the invention has been described with reference to a single mode fiber, i.e. SMF-28, the concepts of the present invention are applicable to multi-mode optical fibers as well.

Accordingly, what is claimed is:

1. An optical fiber ribbon, said optical fiber ribbon comprising:
   at least two optical fibers, each of said optical fibers comprising a core capable of transmitting light;
   at least one of said optical fibers comprising a primary coating surrounding said core, said primary coating comprising a photoinitiator which has a peak absorbance in a relatively short wavelength UV spectrum, a secondary coating surrounding said primary coating, said secondary coating comprising a photoinitiator which has a peak absorbance in a relatively long wavelength UV spectrum, said relatively long wavelength UV spectrum comprising a wavelength band of about 300–380 nm; and
   a ribbon matrix coating, said ribbon matrix including a photoinitiator comprising a peak absorbance at a relatively long wavelength UV spectrum, said ribbon matrix coating disposed about said optical fibers.

2. The optical fiber ribbon of claim 1, wherein said secondary coating photoinitiator peak absorbance is about 300–350 nm.

3. The optical fiber ribbon of claim 1, wherein said secondary coating photoinitiator comprises an alpha-Amino ketone material.

4. The optical fiber ribbon of claim 1, wherein said secondary coating comprises UV absorbers for enhancing its short wavelength UV spectrum absorption.

5. The optical fiber ribbon of claim 1, wherein said ribbon matrix comprises UV absorbers for enhancing its short wavelength UV spectrum absorption.

6. The optical fiber ribbon of claim 1, wherein said optical fiber ribbon comprises a release layer between said ribbon matrix and at least one of said optical fibers.

7. The optical fiber ribbon of claim 1, wherein said ribbon matrix comprises an additive for reducing the coefficient of friction of the ribbon matrix.

8. An optical fiber, said optical fiber comprising:
    a core capable of transmitting light;
    a primary coating surrounding said core, said primary coating formed from a formulation which includes a photoinitiator which has a peak absorbance in a relatively short wavelength UV spectrum;
    a secondary coating surrounding said primary coating, said secondary coating comprising a photoinitiator which has a peak absorbance in a relatively long UV wavelength band of about 300–380 nm.

9. The optical fiber of claim 8, wherein said secondary coating photoinitiator peak absorbance wavelength band is about 300–350 nm.

10. The optical fiber of claim 8, wherein said secondary coating photoinitiator peak absorbance comprises a peak absorbance wavelength band of about 300–320 nm.

11. The optical fiber of claim 8, wherein said secondary coating photoinitiator peak absorbance comprises a peak absorbance wavelength band of about 320–350 nm.

12. The optical fiber of claim 8, wherein said secondary coating photoinitiator comprises an alpha-Amino ketone material.

13. A fiber optic cable, said fiber optic cable comprising:
    a stack of optical fiber ribbons;
    at least one of said ribbons comprising at least two optical fibers, each of said optical fibers comprising a core capable of transmitting light, at least one of said optical fibers comprising a primary coating surrounding said core, said primary coating comprising a photoinitiator which has a peak absorbance in a relatively short wavelength UV spectrum, a secondary coating surrounding said primary coating, said secondary coating comprising a photoinitiator which has a peak absorbance in a relatively long wavelength UV spectrum, said relatively long wavelength UV spectrum comprising a wavelength band of about 300–380 nm, and a ribbon matrix coating, said ribbon matrix including a photoinitiator comprising a peak absorbance at a relatively long wavelength UV spectrum, said ribbon matrix coating disposed about said optical fibers.

14. A fiber optic cable, said fiber optic cable comprising:
    at least one optical fiber, said optical fiber comprising a core capable of transmitting light,
    a primary coating surrounding said core, said primary coating comprising a photoinitiator which has a peak absorbance in a relatively short wavelength UV spectrum,
    a secondary coating surrounding said primary coating, said secondary coating comprising a photoinitiator which has a peak absorbance in a relatively long UV wavelength band of about 300–380 nm.

15. In a method for making an optical fiber, comprising the steps of:
    (a) coating an optical fiber with a primary coating comprising a photoinitiator with a peak absorbance in a relatively short wavelength UV spectrum;
    (b) irradiating said primary coating with a first radiation source, said first radiation source comprising an emission spectrum with a potent wavelength band, said peak absorbance of said photoinitiator in said primary coating comprising a wavelength band which is complementary to that of the potent wavelength band of said radiation source whereby said primary coating is rapidly cured;
    (c) applying a secondary coating on said cured primary coating, said secondary coating comprising a photoinitiator with a peak absorbance in a relatively long wavelength UV spectrum; and
    (d) irradiating said secondary coating with a second radiation source, said second radiation source comprising an emission spectrum with a potent wavelength band, said peak absorbance of said photoinitiator in said secondary coating comprising a wavelength band which is complementary to that of the potent wavelength band of said second radiation source whereby said secondary coating is rapidly cured.

16. In the method of claim 15, wherein said first radiation source potent wavelength band is about 200–300 nm.

17. The method of claim 15, wherein said second radiation source potent wavelength band is about 300–400 nm.

18. The method of claim 15, wherein said secondary coating photoinitiator peak absorbance is about 300–380 nm.

19. The method of claim 15, wherein said secondary coating photoinitiator peak absorbance is about 300–320 nm.

20. The method of claim 15, wherein said second radiation source comprises a mercury vapor plus metal halide type bulb.

21. The method of claim 15, wherein said second radiation source comprises an excimer source.

22. The method of claim 15, wherein said second radiation source comprises an approximate dosage ability above 170 Watts.

23. The method of claim 15, wherein said second radiation source comprises an approximate dosage ability above 600 Watts.

24. The method of claim 15, wherein said second radiation source comprises an approximate dosage ability above 800 Watts.

25. In a method for making an optical fiber, comprising the steps of:
    (a) coating an optical fiber with a primary coating comprising a photoinitiator with a peak absorbance in a relatively short wavelength UV spectrum;
    (b) irradiating said primary coating with a first radiation source, said first radiation source comprising an emission spectrum with a potent wavelength band, said peak absorbance of said photoinitiator in said primary coating comprising a wavelength band which is complementary to that of the potent wavelength band of said radiation source whereby said primary coating is rapidly cured;
    (c) applying a secondary coating on said cured primary coating, said secondary coating comprising a photoinitiator with a peak absorbance in a relatively long wavelength UV spectrum of about 300–320 nm; and
    (d) irradiating said secondary coating with a second radiation source, said second radiation source comprising an excimer type UV radiation source with an emission spectrum having a potent wavelength band between about 300–350 nm, and a dosage ability of over about 170 Watts, said peak absorbance of said photoinitiator in said secondary coating is complementary to that of the potent wavelength band of said second radiation source whereby said secondary coating is rapidly cured.

* * * * *